Figure 1:
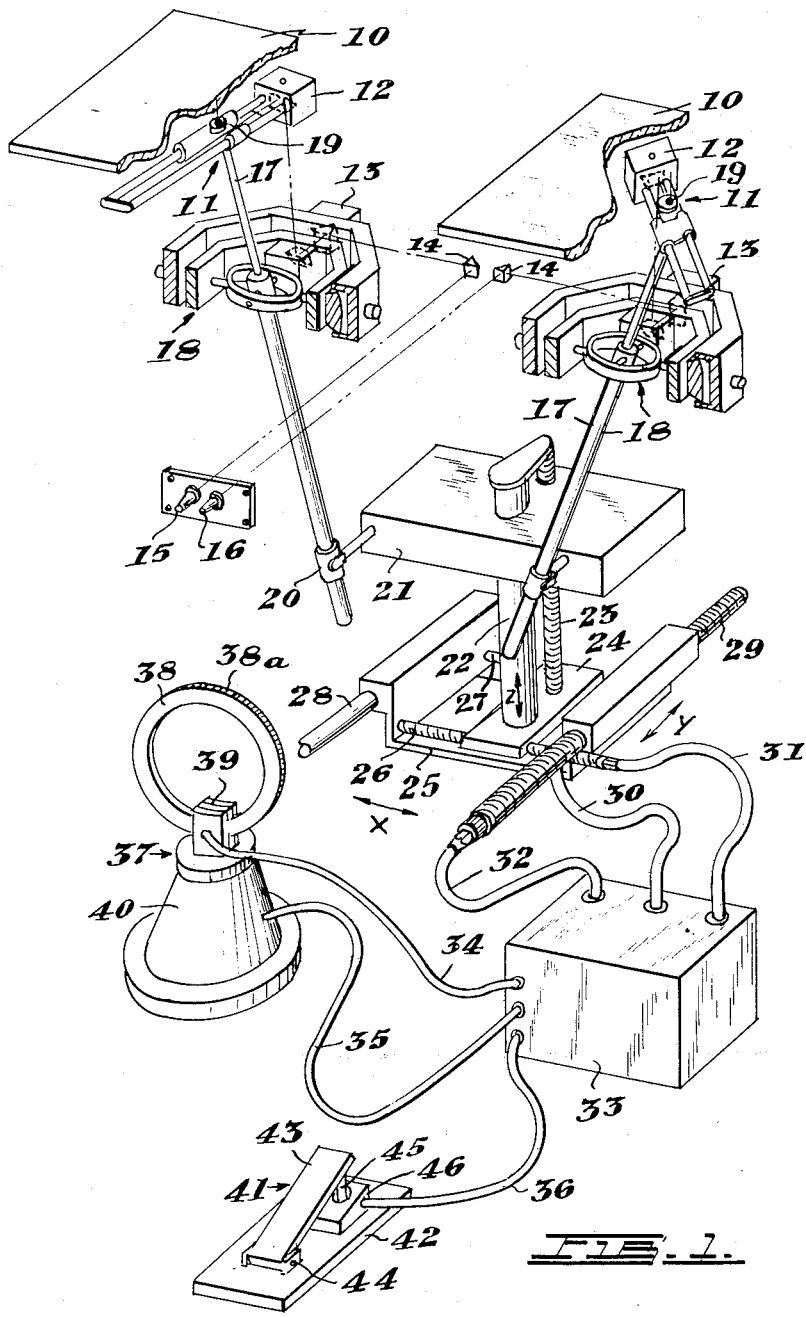

INVENTORS
CHARLES R. CLEMENCE
THEODORE J. BLACHUT
CORNELIS VAN DERHOEVEN

By— Smart+Biggar
ATTORNEYS

INVENTORS
CHARLES R. CLEMENCE
THEODORE J. BLACHUT
CORNELIS J. VAN DER HOEVEN
By- Smart & Biggar
ATTORNEYS.

United States Patent Office 2,719,254
Patented Sept. 27, 1955

2,719,254

PLURAL FOLLOW-UP SYSTEMS FOR REMOTE POSITIONING APPARATUS

Charles Rickard Clemence, Theodore Josef Blachut, and Cornelis Jan van der Hoeven, Ottawa, Ontario, Canada, assignors to National Research Council, Ottawa, Ontario, Canada, a body corporate of the Research Council Act Application January 11, 1954, Serial No. 403,345

3 Claims. (Cl. 318—19)

The invention relates to steering apparatus for directing the course of an object along a desired path by controlling the motivation of each of a plurality of carriages relatively movable at right angles to each other and cooperating to move the object. The term "carriage" is used in this specification to mean a means of conveyance.

Prior to the invention apparatus has been available for moving an object along a predetermined path by motivation of each of at least two carriages relatively movable at right angles to each other, the carriages being individually controlled by a handwheel for each carriage. This type of apparatus is used in a photogrammetric plotting machine such as is used to trace out maps from aerial photographs which are arranged for stereoscopic viewing by the operator of the machine. In such a machine the object to be guided is the combined image, as seen through the eye-pieces of the machine, of the floating marks which are arranged to be moved over the photographs by the cooperative movements of the carriages. The operator must guide the floating marks (and consequently the combined image of the floating marks) along any predetermined path in the photographs, for example, a roadway or the shore line of a lake, while the machine through conventional connections with a plotting table automatically plots the path followed by the combined image. The path followed by the image is plotted by some means such as a pencil resting on drawing paper.

Some photogrammetric machines are arranged for guiding the combined image of the floating marks in two dimensions, while other machines are arranged for guiding the image in three dimensions so that it may follow a path involving changes in elevation as shown in the stereoscopically viewed photographs. In the case of a machine which works in two dimensions, the operator must control and coordinate the movement of each of two carriages movable at right angles to each other and cooperating to move the floating marks over the photographs. The control for each carriage is a handwheel and it is necessary for the operator to adjust simultaneously each handwheel as required to cause the combined image of the floating marks to follow the desired path. This requires considerable training of the operator and even a trained operator is under considerable strain while coordinating the movement of the two separate handwheels to cause the combined image of the floating marks to follow a desired path.

In the case of a machine which controls movement of the floating marks in three dimensions, three carriages are required relatively movable at right angles to each other and cooperating to move the floating marks. Control of the motivation of each of the three carriages in known machines requires three separate manually operated controls such as two handwheels and a foot control. Operation of such a machine is much more difficult than that of a two dimensional machine as described above because there is a much greater problem in coordination of movement of three separate controls each of which affects movement of the floating marks in one direction but the combined effect of all three being to move the floating marks along a desired path.

It is necessary that the operator exactly coordinate the speed of movement of each of the carriages whether movement is being controlled in two dimensions or in three dimensions. The speeds of movement of the carriages must be kept at a ratio which is constant so long as it is desired that the path traversed by the floating marks extend in a straight line. When it is desired that the path curve, the problem of the operator in varying the ratio between the speeds of movement of the carriages to obtain the required curve is further complicated.

The machine referred to above is a photogrammetric plotting machine but similar machines may be used for other purposes such as apparatus for following the flight of an aircraft, or apparatus such as used in observatories for controlling movement of a telescope.

An object of the invention is, therefore, to simplify the operation of machines of the type described by providing a steering apparatus requiring fewer manually operated controls than the number of carriages used to move the object which is to be guided.

A further object of the invention is to provide manually operable steering apparatus for machines of the type described for moving an object, whereby the object which may be the plotting mark or plotting pencil of a photogrammetric plotter, may be set on a desired course which it then follows at substantially uniform speed.

A further object of the invention is to provide manually operable steering apparatus for steering an object movable three dimensionally in accordance with the cooperation of three carriages whereby the object may be to set on a desired three-dimensional course which it then follows at a substantially uniform speed.

A further object of the invention is to provide such apparatus in which the object is steered by the movement of one steering member, whether the object is moved in two dimensions or in three dimensions.

According to the invention steering apparatus is provided for guiding an object along a predetermined path by controlling motivation of each of at least two carriages relatively movable substantially at right angles to each other and cooperating to move the object. The steering apparatus comprises a manually operable potentiometer which provides at least two output voltages in sine-cosine relationship, and motor means for each of the carriages, each motor means being controlled by one of the output voltages from the potentiometer.

In the case of controlling movement of the object in three dimensions, three carriages are required relatively movable at right angles to each other and cooperating to move the object. Steering apparatus in accordance with the invention for controlling the motivation of the three carriages comprises a first manually operable potentiometer adapted to provide three operable output voltages of which the first and second are operable in sine-cosine relationship and the third has a 180° phase difference from the first, each output voltage being variable from zero to a maximum value. A second manually operable potentiometer is adapted to provide two output voltages operable in sine-cosine relationship, the second potentiometer being connected to be energized with the potential difference between the first and third output voltages of the first potentiometer. Motor means is provided for each of the three carriages, one motor means being controlled by the second output voltage of the first potentiometer and the other two motor means being each controlled by one only of the output voltages of the second potentiometer.

Steering apparatus in accordance with the invention may comprise a source of manually variable voltage for supplying voltage to the manually operable potentiometers whereby the speed of travel of the object can be controlled. The motor means for driving each carriage is preferably a velocity servo of conventional design having a generator driven by a motor, the generator being connected to supply a voltage to the velocity servo in opposition to the output voltage being supplied to control that velocity servo.

Steering apparatus according to the invention for two dimensional control of the movement of an object, requires a single steering means which may be in the form of a steering wheel such as is commonly used in automobiles. This steering wheel is connected to drive the sine-cosine potentiometer which automatically coordinates the control of each of the two carriages. In the case of steering apparatus in accordance with the invention for three dimensional control of the movement of an object, a single steering ring may be used, the steering ring being rotatable in its own plane to drive one sine-cosine potentiometer and rotatable about an axis lying in its own plane to drive the other sine-cosine potentiometer. In this way, use of a single steering ring controls the two sine-cosine potentiometers which in turn coordinate the motivation of each of the three carriages which are relatively movable substantially at right angles to each other and cooperate to move the object. Thus, in accordance with the invention the operator of a machine such as a photogrammetric plotting machine is not required to coordinate the movement of as many controls as in the past in order to obtain the desired result. Use of steering apparatus in accordance with the invention results in less training time being required for operators, and much less strain is placed upon an operator while using the machine.

Figure 2:
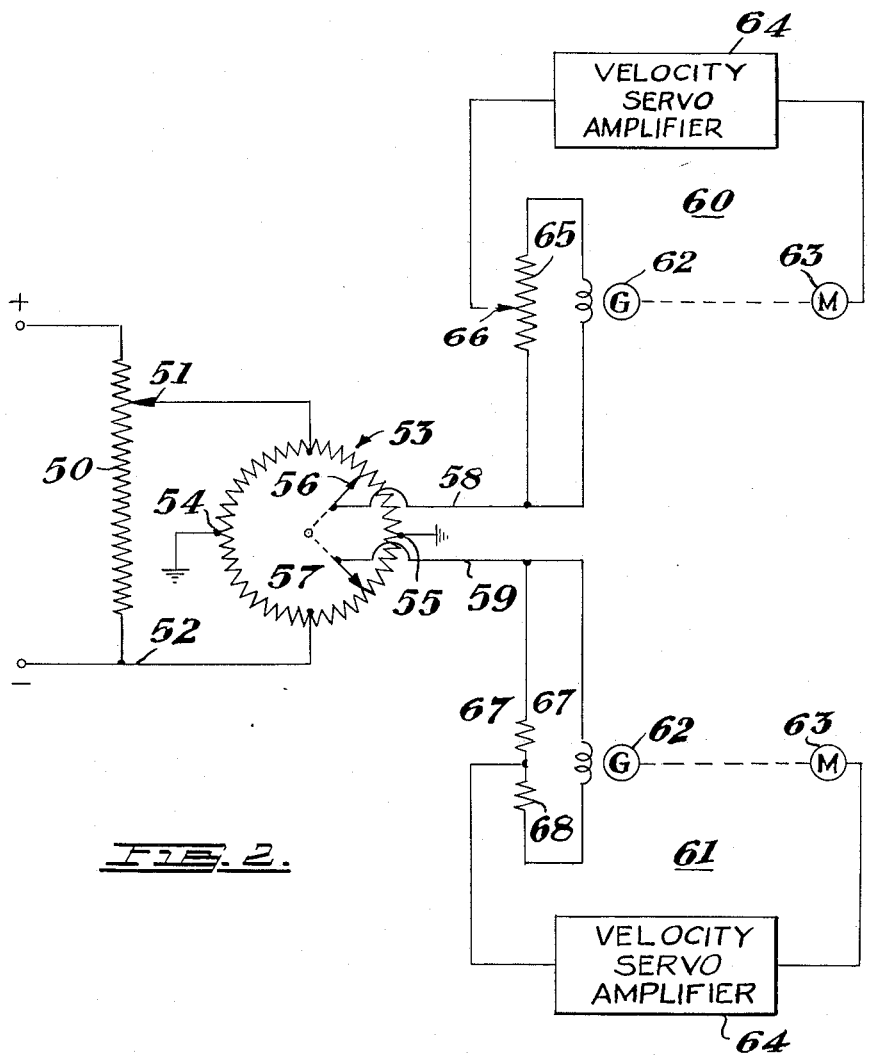
Figure 3:
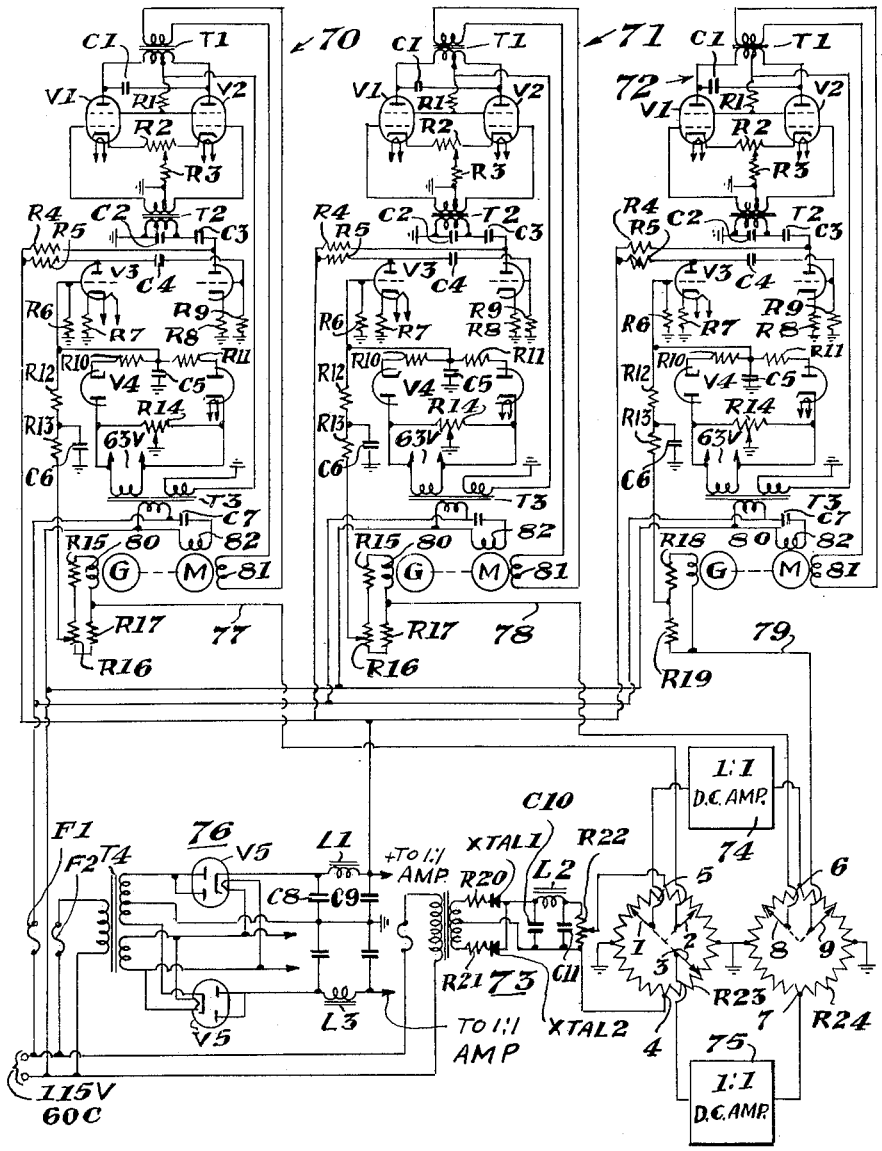

The invention will be further described with reference to the accompanying drawing, in which Figure 1 shows steering apparatus according to the invention connected to steer the floating marks and the associated plotting pencil of a known photogrammetric plotter illustrated schematically;

Figure 2 is a schematic circuit diagram of an embodiment of the invention for two-dimensional steering; and Figure 3 is a schematic wiring diagram of an embodiment of the invention for three-dimensional steering.

In a photogrammetric plotter of the type illustrated schematically in Figure 1, each of two photographs, which together form a stereoscopic picture, is held by a picture carrier 10 so that each photograph can be scanned by a lens unit 11 forming part of an optical system including prism units 12, 13 and 14. The two optical systems are coupled for stereoscopic viewing of the two photographs through the eye-pieces 15 and 16.

Each lens unit 11 is mounted at the end of a guide rod 17 pivotally mounted between its ends in a gimbal ring unit 18 whereby the lens unit 11 including the usual floating mark 19 may be moved over the photograph so that the floating mark 19 follows a desired path on the photograph and may at the same time be made to appear to move vertically in the stereoscopic picture so that full spatial control of the floating mark is obtained.

Each of the guide rods 17 is slidable longitudinally in a sleeve 20 pivotally connected to a carriage 21 movable vertically on a guide post 22 on rotation of a threaded shaft 23 operationally engaging a correspondingly threaded bore in the carriage 21. The guide post 22 and the shaft 23 are mounted on a carriage 24 supported for movement from side to side of a carriage 25 on rotation of a threaded shaft 26 cooperating with a correspondingly threaded bore in the carriage 24. The threaded shaft 26 supports one end of the carriage 24 and the other end is supported on a guide bar 27. The carriage 25 is in turn mounted on a guide bar 28 and a threaded shaft 29 whereby on rotation of the threaded shaft 29 cooperating with a threaded bore in the carriage 25, the carriage 25 is movable endwise of the bar 28 and shaft 29. On simultaneous rotation of the shafts 29, 26 and 23, the carriage 21 may be simultaneously moved in a transverse direction X, in the front and back direction Y, and in the vertical direction Z; X and Y directions being at right angles to each other in the same plane and the Z direction being at right angles to the plane of X and Y.

A photogrammetric plotter, as for instance indicated in Figure 1, is normally connected to a drawing table also provided with two carriages movable in a horizontal plane at right angles to each other and carrying a plotting pencil for tracing the movement of the floating marks 19. One carriage at the drawing table is connected by flexible shafting to the carriage 24 for movement in the X direction, and the other carriage is connected to the carriage 25 in a similar manner for movement in the Y direction. Any desired path on the stereoscopically viewed photographs along which the floating marks 19 are steered may thus be drawn on the drawing table. Changes in apparent elevation of the image of the floating marks are necessary but there is of course need only for two-dimensional movement on the drawing table in the X and Y directions. It will be understood that the carriage 24 in Figure 1 constitutes what may for convenience be referred to as the X carriage because it effects the movement of the object (the single image of the floating marks 19 or a plotting pencil) in the X direction, and similarly, the carriage 25 is the Y carriage, and the carriage 21 is the Z carriage. If the X and Y carriages 24 and 25 are moved at the same speeds, the guide post 22 and thus the image of the floating marks 19, will be moved along a path exactly bisecting the right angle between the directions X and Y. If, however, the carriage 24 is moved faster than the carriage 25, the angle between the X direction and the path followed by the image of the floating marks 19, is smaller than the angle between such path and the Y direction.

As described above, the carriages 21, 24 and 25 are driven by threaded shafts 23, 26 and 29. The threaded shafts 23, 26 and 29 are in turn driven by flexible shafts 30, 31 and 32 which are connected to a steering control box 33 which has a motor for driving each of the shafts 30, 31 and 32. The control box 33 is controlled by three sets of electrical connections 34, 35 and 36. The connections 34 and 35 lead to a steering device 37, and the connection 36 leads to a foot pedal 41.

The steering device 37 comprises a steering ring 38 which is rim mounted by a housing 39. The steering ring 38 includes a toothed ring 38a running around its outer periphery and engaging reduction gearing within the housing 39. The reduction gearing is arranged to drive a potentiometer which will be described later in connection with the electrical circuits. The electrical connection 34 provides the electrical connections from the potentiometer to the control box 33. The housing 39 is rotatably mounted upon a pedestal 40 and, within the pedestal 40, there is arranged a second potentiometer which is connected to be driven by rotation of the housing 39. The electrical connection 35 provides the required electrical connections from the second potentiometer to the control box 35. The pedestal 40 may be fitted with a base suited for standing upon a table so that the steering ring 38 is supported at a suitable position beneath the eye-pieces 15 and 16 for hand operation. With this arrangement, rotation of the steering ring 38 in its own plane rotates the potentiometer within the housing 39 whereas rotation of the steering ring 38 about an axis in line with the rotational axis of the housing 39 rotates the second potentiometer located within the pedestal 40. As will be described in detail below, the potentiometer within the housing 39 which is operated by rotation of the steering ring 38 in its own plane, controls movement of both the carriages 24 and 25. The potentiometer within the pedestal 40 which is controlled by rotation of the block 39 controls movement of the carriage 21 in proper relation to movement of the carriages 24 and 25.

The foot pedal 41 controls the speed of the image of the floating marks 19 as viewed through the eye-pieces 15 and 16. The foot pedal comprises a base 42 having a foot operated lever 43 hinged to the base 42 by a pivot 44. The foot lever 43 is spring urged away from the base 42 but is linked to the base by an arm 45 connecting into a housing 46. The housing 46 contains a potentiometer having its electrical connections brought out through the connection 36 to the control box 33. The arm 45 is fitted with a rock type gear which engages gearing attached to the potentiometer. This gearing is arranged so that any desired angle of travel of the foot pedal 43 turns the potentiometer through its full range. The potentiometer in the housing 46 is arranged to control the voltage supplied to servo amplifiers which control the motors driving the flexible shafts 30, 31 and 32 so that depressing the foot lever 43 increases the control voltages and thereby changes the speed of movement of the image of the floating marks 19 as viewed through the eye-pieces 15 and 16.

The apparatus shown in Figure 1 is designated for three-dimensional movement of the image of the floating marks 19 as viewed through the eye-pieces 15 and 16. It may, if desired, be adapted for two-dimensional movement and in this case no drive would be supplied to the threaded shaft 23 and only the threaded shafts 26 and 29 would be driven. Accordingly, only two flexible shafts would be required to be connected to the control box 33 and the potentiometer within the pedestal 40 and its electrical connection 35 would not be required. Rotation of the steering ring 38 in its own plane would control direction of movement in the X—Y plane of the image of the floating marks 19 as viewed through the eye-pieces 15 and 16, while the foot pedal 41 would control speed of the image. An electrical circuit for two-dimensional steering apparatus is shown in Figure 2.

As shown in Figure 2 a potentiometer 50 is connected across a floating direct current power supply. The movable contact 51 of the potentiometer 50 and a connection 52 from the negative side of the power supply are connected to a sine-cosine potentiometer 53. The zero voltage points 54 and 55 of the sine-cosine potentiometer 53 are connected to ground. The two movable arms 56 and 57 of the sine-cosine potentiometer 53 have connections 58 and 59 which lead to two velocity servo systems 60 and 61. Each of the velocity servo systems 60 and 61 comprises a generator 62, a motor 63 in driving connection with the generator 62, and a velocity servo amplifier 64 of conventional design. The circuits of the velocity servo amplifiers 64 will be described in some detail below in connection with Figure 3. The generator 62 of the velocity servo system 60 is connected to supply its voltage across a potentiometer 65 of which the movable arm 66 is connected to supply input voltage to the velocity servo amplifier 64. In the case of the velocity servo system 61, the generator 62 is connected to supply its voltage across a pair of series connected resistors 67 and 68. The series connection between the resistors 67 and 68 supplies the input voltage to the velocity servo amplifier 64 of the velocity servo system 61.

The potentiometer 50 corresponds to the potentiometer operated by the foot lever 43 (Figure 1) and serves to control speed. The sine-cosine potentiometer 53 corresponds to the potentiometer within the housing 39 which is driven by rotation of the steering ring 38 in its own plane. The remainder of the apparatus shown in Figure 2 would be contained within the velocity servo control box 33.

In operation, the motors 63 of the two-dimensional steering apparatus of Figure 2 would be connected to the flexible shafts 31 and 32 so as to operate the carriages 25 and 24 in the X and Y directions respectively. The control voltage for each motor 63 is obtained from the output of the velocity servo amplifier 64 connected in the same velocity servo system, and the input voltage to the velocity servo amplifier 64 is obtained from a combination of the voltage supplied from the sine-cosine potentiometer 53 and that supplied from the generator 62. The voltage supplied by the generator 62 in accordance with conventional practice in velocity servo systems is in opposition to the voltage supplied from the sine-cosine potentiometer 53 so that the motor speed must be directly proportional to the voltage supplied to the servo amplifier. This aids in sudden stops and fast reversals of direction of rotation of the motor 63. The potentiometer 65 is adjusted so that with the same voltages on the connections 58 and 59 the two motors 63 rotate at the same speed. The voltages obtained on the connections 58 and 59 from the sine-cosine potentiometer 53 are in sine-cosine relationship so that as the rotor of the potentiometer is turned their magnitudes vary by a substantially constant 90° phase difference; accordingly if the voltage on one of the connections 58 and 59 is at maximum, the voltage on the other is zero. The voltages on the connections 58 and 59 control the motors 63 which in turn drive the carriage 24 in the X direction and the carriage 25 in the Y direction, so that the combined direction of motion given to each floating mark 19 is determined by the potentiometer 53, while the speed of motion is determined by the potentiometer 50.

Figure 3 shows a circuit diagram for three-dimensional steering apparatus in accordance with the invention. In general, the apparatus comprises three velocity servo control circuits 70, 71 and 72 connected through a pair of potentiometers R23 and R24 to a power supply circuit 73. The potentiometers R23 and R24 which are of the sine-cosine type are interconnected through 1:1 D. C. amplifiers 74 and 75 which are supplied with power from a power supply circuit 76. The power supply circuit 76 also supplies D. C. plate voltage to the velocity servo control circuits 70, 71 and 72.

As indicated on Figure 3, 115 volt, 60 cycle power is supplied to the power supplies 73 and 76, there being approximately 80 volts direct current available across a potentiometer R22 of which the movable tap and one side are connected to supply power to the potentiometer R23. The potentiometer R23 is a conventional sine-cosine potentiometer except that it has a third movable arm fixed at 180° from the first movable arm and 90° from the second movable arm. The two arms which are fixed at 180° apart are connected through 1:1 D. C. amplifiers to supply direct current power to the sine-cosine potentiometer R24. The potentiometer R24 is of conventional construction and is the same as that described above in connection with a sine-cosine potentiometer 53 which is shown in Figure 2. D. C. control voltages to the three-velocity servo control circuits 70, 71 and 72 are supplied through connections 77, 78 and 79 respectively.

In describing the velocity servo control circuits 70, 71 and 72, the same reference designations will be used for parts having the same values and the same functions. The input circuits to the velocity servo control circuits 70 and 71 comprise resistor R15, potentiometer R16, resistor R17 and the winding 80 of a direct current generator G. The input circuit of the velocity control circuit 72 comprises a resistor R18, a resistor R19 and a winding 80 of a direct current generator G. The D. C. voltage supplied by the generator G through its winding 80 is in opposition to the D. C. voltage supplied from the potentiometers R23 or R24 to the input circuits of the velocity servo control circuits 70, 71 and 72. In each input circuit the resultant voltage is fed to the cathode and anode of a double diode tube V4 at their interconnection through resistors R10 and R11. The remaining anode and cathode of the double diode tube V4 are supplied with an A. C. voltage from the transformer T3. The D. C. voltage from the input circuit of the velocity servo control circuit acts to control the A. C. voltage available to the control grid of a triode amplifier V3 as supplied through the double diode tube V4. The tube V3 is a double triode connected so that the signal voltage available from the anode of the left hand triode is amplified by the right hand triode and supplied to the primary of a transformer T2. The transformer T2 is the input transformer for a push-pull amplifier comprising the amplifier tubes V1 and V2. The centre tap of the primary of the output transformer T1 of the push-pull amplifier is supplied with an A. C. voltage of approximately 300 volts from the power transformer T3 and this voltage under control of the signal voltages supplied to the grids of the tubes V1 and V2 is supplied to the secondary of the transformer T1, which is connected to the control winding 81 of a servomotor M having a power supply winding 82 connected to the 115 volt, 60 cycle A. C. power supply. The motor M is connected to drive the generator G.

Before operating the apparatus it is necessary to check that the motor M in each of the velocity servo control circuits 70, 71 and 72 rotates at the same speed for the same input voltage on the connections 77, 78 and 79. Therefore, with the potentiometers R23 and R24 set to supply the same input voltages on the connections 77, 78 and 79, the speeds of the motors M are checked, and taking the speed of the motor M in the velocity servo control circuit 72 as a standard, the speeds of the motors in the velocity servo circuits 70 and 71 are adjusted to the same value by adjusting the potentiometers R16. The potentiometers R2 and R14 are adjusted to obtain balanced operation of the tubes connected to them as is conventional in these types of circuits.

Although the design of the particular circuits used in the velocity servo control circuits 70, 71 and 72 and of the power supply circuits 73 and 76 involves only ordinary skill in this art, the following list of values of the various components is supplied for reference in consideration of the circuits:

| Reference Designation | Value |
|---|---|
| R1 | 10,000 ohms, 2 watts, resistor. |
| R2 | 50 ohms, 1 watt potentiometer. |
| R3 | 200 ohms, 2 watts, resistor. |
| R4, R5 | 100,000 ohms, 1 watt, resistor. |
| R6, R9 | 470,000 ohms, 1 watt, resistor. |
| R7, R8 | 1,700 ohms, 1 watt, resistor. |
| R10, R11 | 22,000 ohms, 1 watt, resistor. |
| R12, R13 | 220,000 ohms, 1 watt, resistor. |
| R14 | 100 ohms, 1 watt potentiometer. |
| R15 | 2,200 ohms, 1 watt, resistor. |
| R16 | 2,500 ohms, 1 watt, potentiometer. |
| R17:19:20:21 | 3,300 ohms, 1 watt, resistor. |
| R18 | 4,700 ohms, 1 watt, resistor. |
| R22 | 5,000 ohms, 4 watts, potentiometer. |
| R23 | 20,000 ohms, sine-cosine potentiometer. |
| R24 | Do. |
| C1 | 0.25 microfarad, condenser. |
| C2:3:4 | 0.1 microfarad, condenser. |
| C5 | 0.4 microfarad, condenser. |
| C6:7:8:9:10:11 | 4 microfarad, electrolytic condenser. |
| T1 | 5.3:1 transformer. |
| T2 | 1:2 transformer. |
| T3 | 115 volts:300 volts and 6.3 volts, transformer. |
| T4 | 115 volts:275 volts, 275 volts, 5 volts and 6.3 volts, transformer. |
| T5 | 4:1 transformer. |
| L1 | 7 henries. |
| L2 | 60 henries. |
| XTAL 1 and 2 | 100 milliampere selenium rectifier. |
| V1 and V2 | type 6AQ5 tubes. |
| V3 | type 12AX7 tube. |
| V4 | type 6AL5 tube. |
| V5 and V6 | type 6X4 tubes. |
| F1 and F2 | 1.5 ampere, 115 volt fuses. |
| F3 | 1 ampere, 115 volt fuse. |
| G | D. C. generator. |
| M | 110 volt servomotor. |

The potentiometer R22 of Figure 3 corresponds to the potentiometer operated by the accelerator foot pedal 41 shown in Figure 1, the potentiometers R23 and R24 correspond to the potiometers operated by the steering ring 38 and contained in the housing 39 and the pedestal 40. The power supply circuits 73 and 76 and the velocity servo control circuits 70, 71 and 72 with their associated motors and generators are contained in the velocity servo control box 33 of Figure 1. As shown in Figure 1, the motors M are connected by flexible shafts 30, 31 and 32 to drive the carriages 21, 24 and 25. For any given setting of the potentiometer R22 (Figure 3), as determined by the accelerator foot pedal 41 (Figure 1), the floating marks 19 (Figure 1), will follow with constant speed a course as set by the sine-cosine potentiometers R23 and R24. If desired the speed of the floating marks 19 may be altered by adjustment of the potentiometer R22, and this does not change the direction of movement of the floating marks 19. Accordingly the steering apparatus can be used to direct the course of an object anywhere in a three dimensional field with constant speed by means of a single control element, such as the steering ring 38 shown in Figure 1, while provision is made to alter the value of the speed of the object without changing its direction of movement.

What we claim as our invention is:

1. Steering apparatus for guiding an object along a predetermined path by controlling the motivation of each of three carriages relatively movable substantially at right angles to each other and cooperating to move said object; said steering apparatus comprising a first manually operable potentiometer adapted to provide three variable output voltages of which the first and second are variable in sine-cosine relationship and the third has a 180° phase difference from the first, each output voltage being variable from zero to a maximum value, a second manually operable potentiometer adapted to provide two output voltages variable in sine-cosine relationship, the second potentiometer being connected to be energized with the potential difference between the first and third output voltages of the first potentiometer, motor means for each of said three carriages, one said motor means being controlled by the second output voltage of the first potentiometer and the other two said motor means each being controlled by one only of the output voltages of the second potentiometer.

2. Steering apparatus as claimed in claim 1 comprising a source of manually variable voltage for supplying voltage to the first potentiometer whereby the speed of travel of the object can be controlled.

3. Steering apparatus as claimed in claim 2 in which each motor means is a velocity servo having a generator driven by the motor means, said generator being connected to supply a voltage to the velocity servo in opposition to the output voltage being supplied to that velocity servo.

References Cited in the file of this patent

UNITED STATES PATENTS

| | | |
|---|---|---|
| 2,410,295 | Kuehni et al. | Oct. 29, 1946 |
| 2,627,055 | Calosi | Jan. 27, 1953 |
| 2,673,951 | Morel | Mar. 30, 1954 |